April 27, 1926.

B. F. WILDER

FISHING LURE

Filed August 10, 1921

1,582,716

INVENTOR
Benjamin F. Wilder
BY
Kerr, Page, Cooper & Hayward
ATTORNEYS

Patented Apr. 27, 1926.

1,582,716

UNITED STATES PATENT OFFICE.

BENJAMIN F. WILDER, OF NEW YORK, N. Y.

FISHING LURE.

Application filed August 10, 1921. Serial No. 491,073.

*To all whom it may concern:*

Be it known that I, BENJAMIN F. WILDER, a citizen of the United States of America, residing at New York, in the county and State of New York, have invented certain new and useful Improvements in Fishing Lures, of which the following is a full, clear, and exact description.

This invention relates to fishing lures, and its chief object is to provide a lure which not only imitates a bait-fish or minnow in appearance but also in action, when cast, simulates the feeble or erratic motion of an injured minnow, thereby making the lure more attractive to the fish. To this end the invention comprises, generally, a rigid head composed of cork or other suitable buoyant material, firmly mounted on a hook and shaped and colored to resemble the head of a bait-fish or minnow; a body, composed of feathers, hair, or other suitable material, colored or uncolored, mounted on the head or on the hook-shank in such a way as to have the shape of a minnow's body, yet be freely flexible so as to wave freely when used, and permit the hook to penetrate the flesh of a striking fish; and a hackle of feathers, hair, or other suitable material, colored or uncolored, mounted at the rear of, or behind, the head, in such manner as to model or merge the lines of the head into those of the body. In fashioning the lure, the hook is set in a slot cut in the underside of the head-portion, and in securing the hook and head together this slot is preferably left open or partly open and the hook canted slightly to one side, with the result that when the lure is drawn along the surface of the water on the recovery the effect of the offset slot will give the lure an irregular motion, chiefly from side to side, thus further simulating the movements of a minnow which has been hurt or injured.

Referring to the accompanying drawing.

In the lure illustrated, the head 10 is shaped, and in some cases colored, to imitate the particular minnow or bait-fish to which the fish are accustomed. The head is made of cork, cork-composition, or other light buoyant material, and the under side at the mouth has a pronounced slope or curve upwardly, as indicated at 11, so that when the fly rod with which the lure is cast is raised and the floating portion of the line is thereby drawn along the surface of the water, drawing the lure with it, the head will not dive but will rather tend to ride up. This makes the lure a strictly surface bait, and relieves the rod of undue strain on the "recovery".

Figure 1:
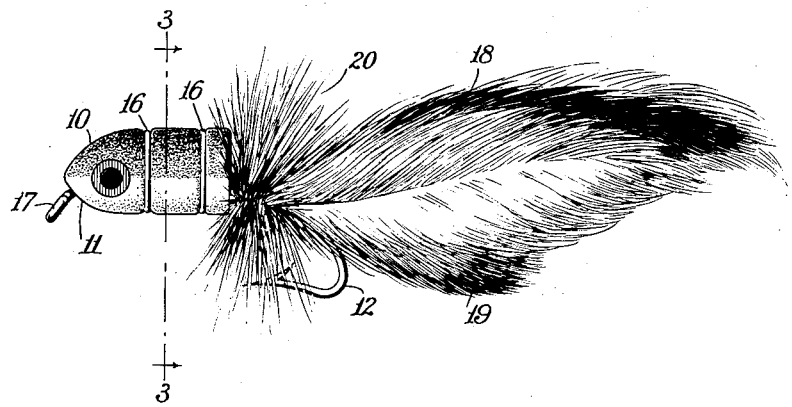
Fig. 1 is a side view of my improved lure in its preferred form.
Figure 2:
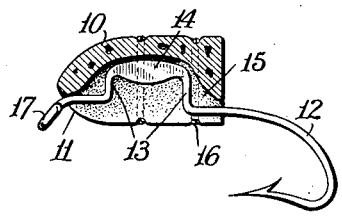
Fig. 2 is a longitudinal section of the head, showing the novel type of hook that I prefer to use.
Figure 3:
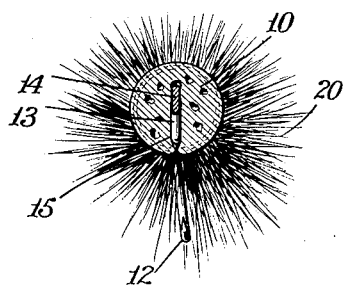
Fig. 3 is a cross section about on line 3—3 of Fig. 1, looking in the direction of the arrows.

The hook 12 is of the special shape illustrated, having its body portion bent to inverted U-shape, the vertical offsets or legs 13, 13, being connected by an intermediate portion 14 which is flattened as clearly shown in Figs. 2 and 3. The underside of the head has a deep slot, 15, into which the flattened portion of the hook is inserted, as in Fig. 2, after which the head is tied or secured to the hook by the threads 16, Fig. 1. The threads are drawn tightly enough to hold the parts firmly, but at the same time I preferably leave the slot open at the bottom, especially at front and rear. The eye 17 extends downwardly from the mouth and the barbed portion extends backwardly and downwardly from the rear of the head, thus locating the center of gravity below the center of the head and hence causing the head to assume substantially the position of a live fish. The rearward portion of the hook may be canted more or less to one side as indicated in Fig. 3 so that the head will "heel over" or list slightly when floating on the water, as will be readily understood.

In the lure shown, the body 18 is composed of several feathers, arranged in vertical planes and secured preferably by tying them to the hook, arranging the feathers in such fashion as to imitate as closely as possible the rearwardly tapering body of a minnow, adding, if desired, one or more feathers 19 to give the appearance of a fin. In most cases the body feathers are colored like the head. Such a body is very flexible, especially from side to side, so that as the bait is drawn along the surface of the water the body will swing or wave to and fro. At the same time the body has a substantial appearance, like the body of a minnow.

The hackle 20, composed preferably of cock's hackles tied on the hook just behind the head where the shafts of the feathers 18 are tied, is intended to merge the body and head together, and is usually colored to aid the illusion. In practice the hackle is heavily stiffened with collodion, varnish, or other suitable material, so that the portion extending in front of and around the point of the hook will fend off light weeds or grass, or cause the lure to ride over the same when used in weedy water.

When the lure is cast (using a fly rod for the purpose) it rests horizontally on the surface of the water, on its belly. As the rod is raised again, the portion of the line floating on the water in front of the lure is not only drawn up but also along the surface of the water, pulling the lure after it. It will be noted that, whereas the forward end of the head tapers forwardly, the rear end or stern of the head is square or blunt. By virtue of this construction the forward movement of the lure sets up a wake at the stern of the head 10 and imparts a lateral waving motion to its feather body, which is accentuated and made more erratic or irregular by the slot in the underside of the head and by the sidewise tilt of the head due to the slight canting of the hook. The result is a strikingly realistic imitation of the feeble movements of an injured minnow, swimming at the surface, partly on its belly and partly on its side.

It is to be understood that the invention is not limited to the specific details herein illustrated and described but can be embodied in other forms without departure from its spirit.

I claim:

1. A fishing lure comprising a body portion, a buoyant head portion, and a hook, said hook having its shank bent to form offsets connected by a laterally flattened intermediate portion, said offsets and flattened portion being embedded in said buoyant head portion.

2. In a fishing lure, a solid member having a longitudinal slot, and a hook having its shank bent to U-shape and having the portion of the U between the legs thereof flattened and embedded in said slot.

3. A fishing lure comprising in combination, a buoyant head portion, a hook fixed to the head and having its barbed portion extending rearwardly and downwardly therefrom, and a laterally flexible but comparatively vertically rigid body extending rearwardly from the head and shaped in imitation of the body of a minnow, said head portion being of increasing cross-sectional area from front to rear and terminating in a blunt rear portion.

In testimony whereof I hereto affix my signature.

BENJAMIN F. WILDER.